Oct. 31, 1933.   H. M. STAINFIELD   1,932,425
MACHINE FOR BROACHING
Filed July 29, 1929   9 Sheets-Sheet 3
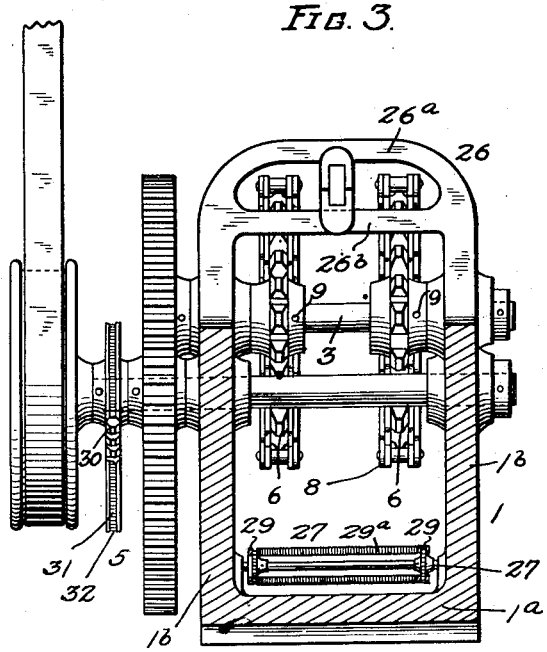
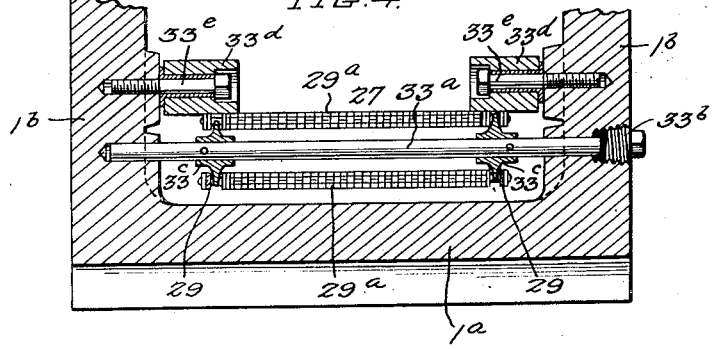
INVENTOR
Harry M. Stainfield
By Geo. A Pitts
ATTORNEY Oct. 31, 1933.  H. M. STAINFIELD  1,932,425
MACHINE FOR BROACHING
Filed July 29, 1929  9 Sheets-Sheet 4

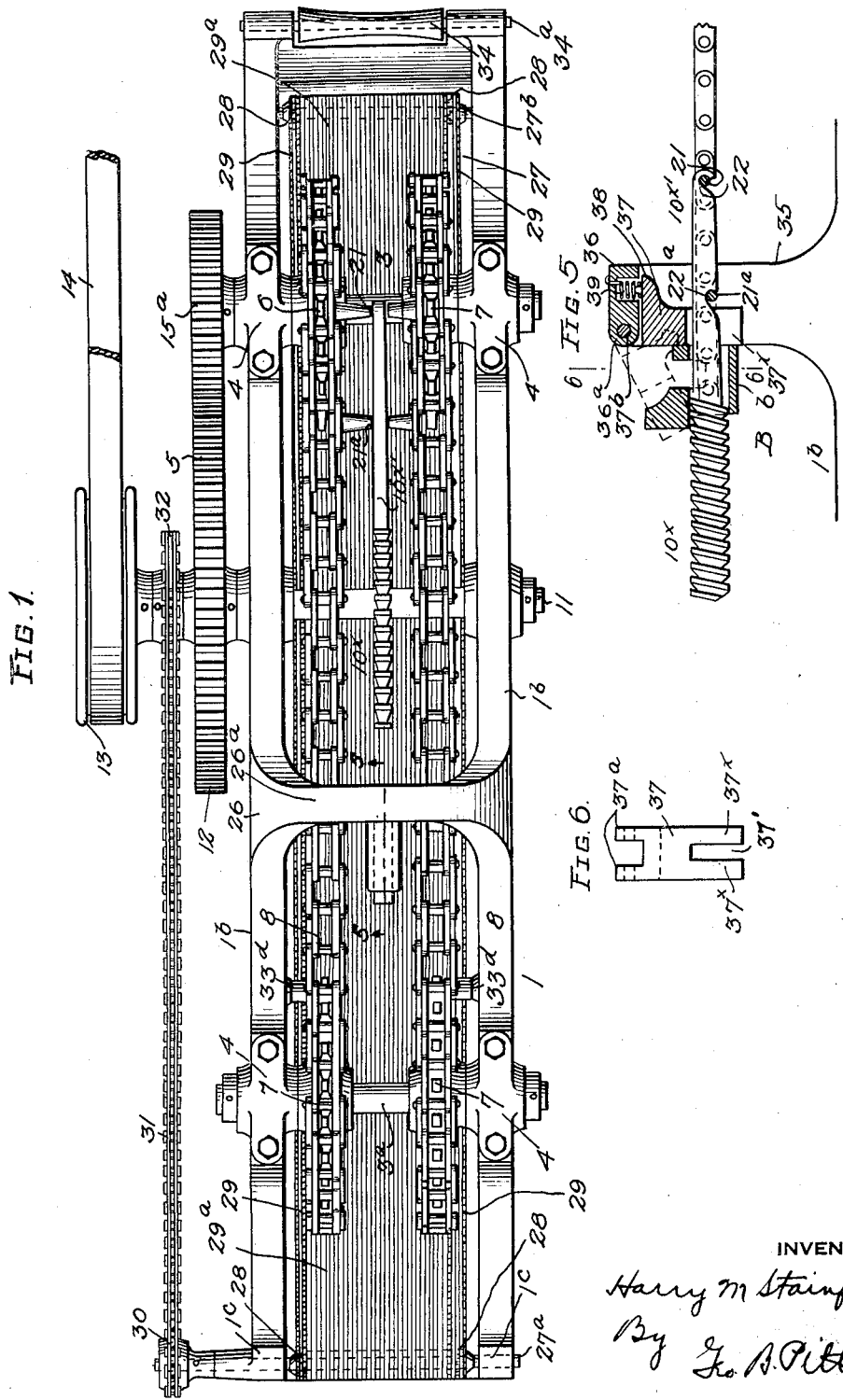

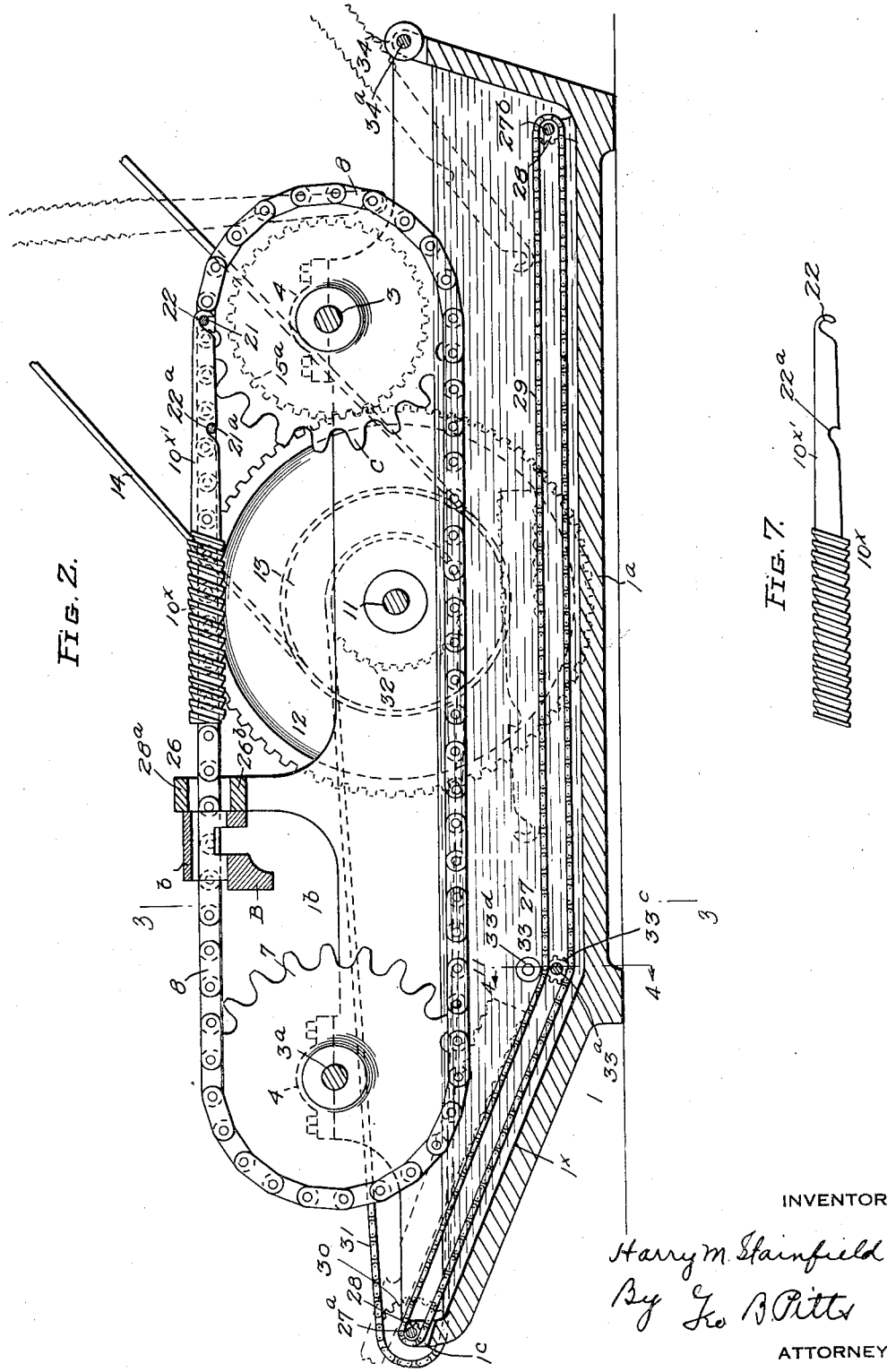

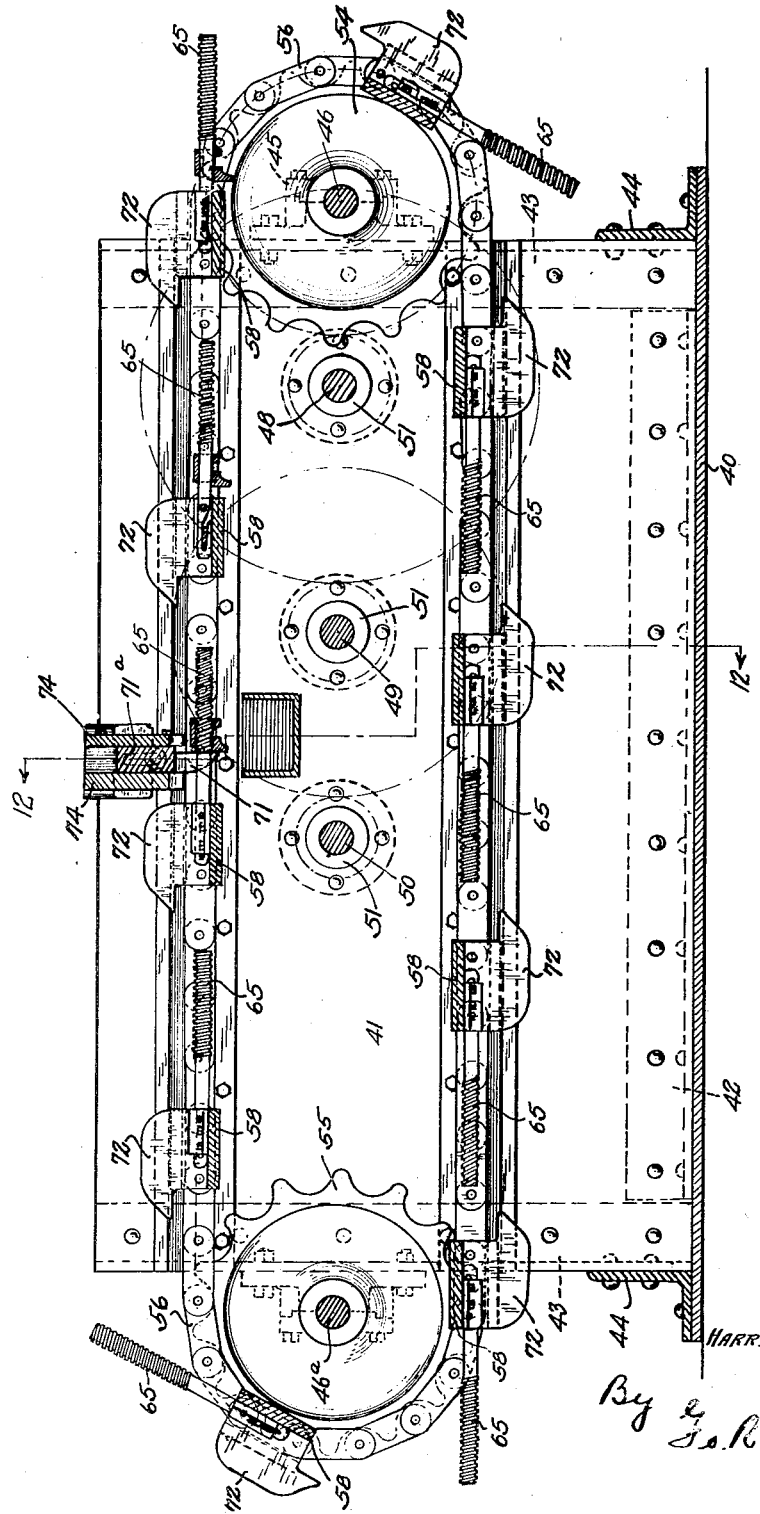

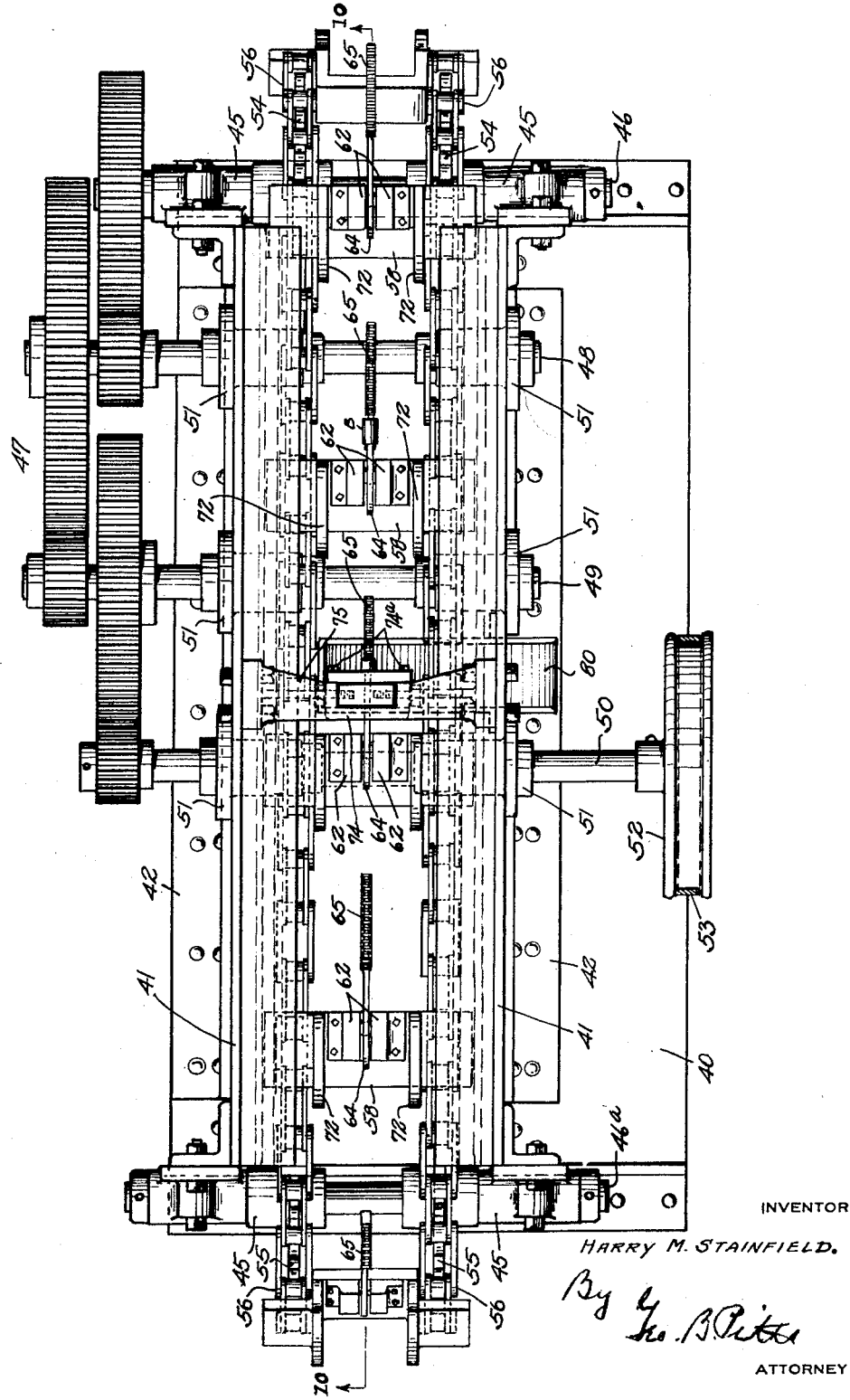

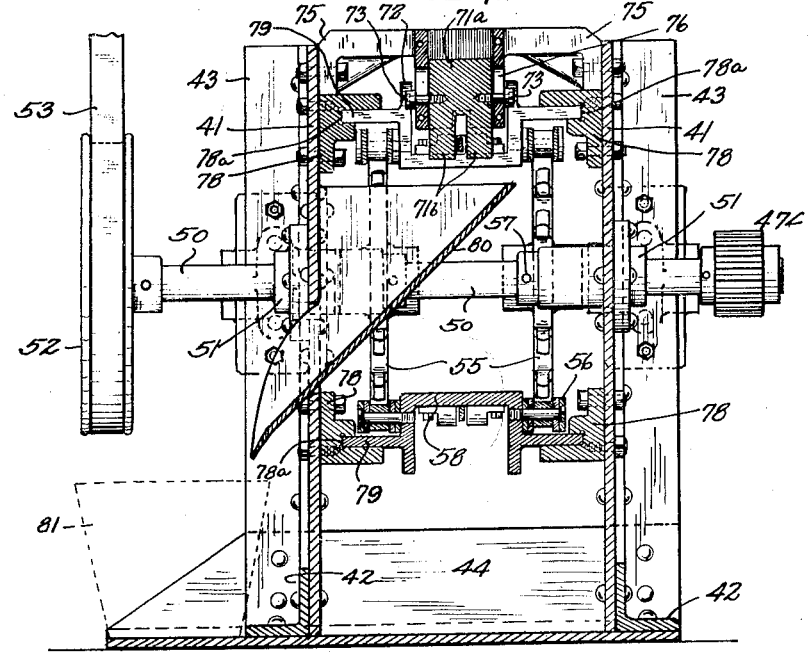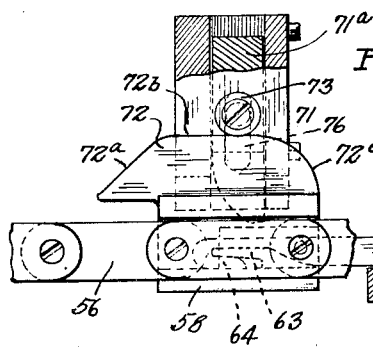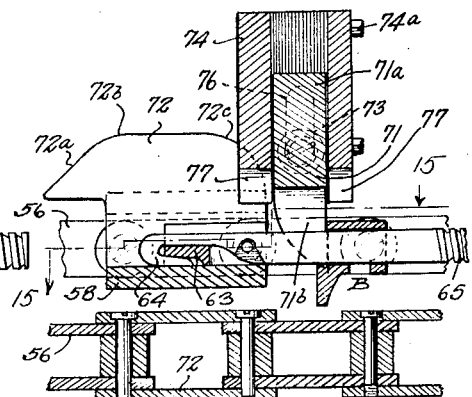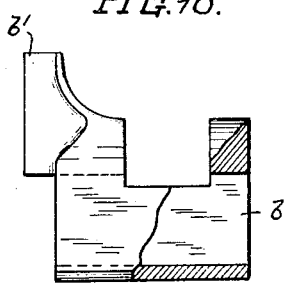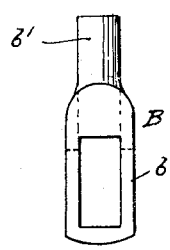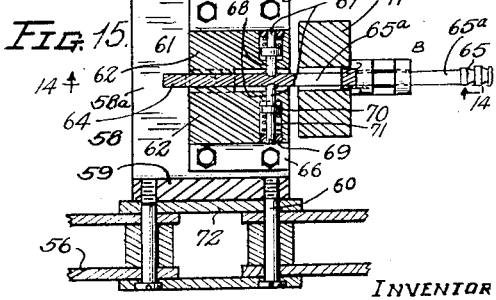

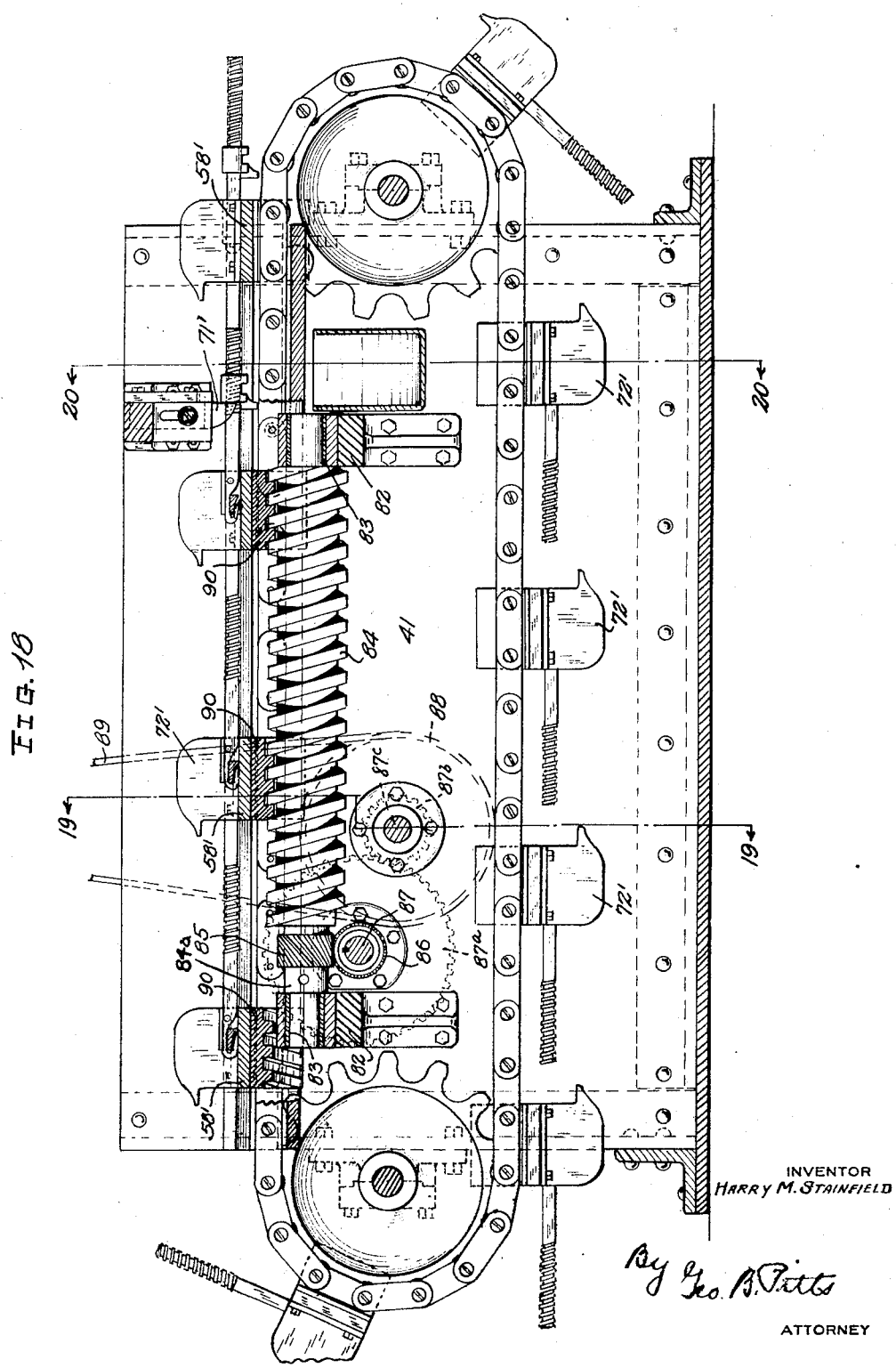

INVENTOR
HARRY M. STAINFIELD.
By
Jno. B. Pitts
ATTORNEY

Patented Oct. 31, 1933

1,932,425

UNITED STATES PATENT OFFICE 1,932,425

MACHINE FOR BROACHING

Harry M. Stainfield, Cleveland, Ohio

Application July 29, 1929. Serial No. 381,973

15 Claims. (Cl. 90—33)

This invention relates to a machine for broaching bodies or blanks of varying shapes and sizes, such as forming key seats and splines in gears and other elements, and the inner walls of wrench jaws.

One object of the invention is to provide a machine of this character that is relatively simple in construction, but permits of large output.

Another object of the invention is to construct an improved machine of this character wherein the broaching tool or tools may be readily mounted and removed.

Another object of the invention is to provide an improved broaching machine wherein a plurality of broaching tools are removably mounted on an endless carrier and the work-pieces are mounted and controlled so that they may be internally broached in a rapid manner.

Another object of the invention is to construct a broaching machine wherein provision is made for connecting together and supporting a plurality of tool supports in an endless series and for applying the power directly to these supports.

Other objects of the invention will be apparent to those skilled in the art to which my invention relates from the following description taken in connection with the accompanying drawings, wherein Fig. 1 is a plan view of a machine embodying my invention.

Fig. 2 is a longitudinal section of the machine shown in Fig. 1.

Fig. 3 is a section on the line 3—3 of Fig. 2.

Fig. 4 is a section on the line 4—4 of Fig. 2.

Fig. 5 is a fragmentary section on the line 5—5 of Fig. 1, but showing a slightly modified construction for the mounting of the blank to be broached.

Fig. 6 is a detail view of the blank mounting taken on the line 6—6 of Fig. 5.

Fig. 7 is a side elevation of the broaching tool used in the form of construction shown in Figs. 1 to 6, inclusive.

Fig. 10 is a longitudinal sectional view of a machine embodying my invention but showing another form of construction.

Fig. 11 is a plan view of the machine shown in Fig. 10.

Fig. 12 is a section on the line 12—12 of Fig. 10.

Fig. 13 is a fragmentary view, partly in section of the parts shown in Fig. 15, but showing the work abutment in elevated position.

Fig. 14 is a section on the line 14—14 of Fig. 15, but showing the work abutment in position to engage the work piece.

Fig. 15 is a section on the line 15—15 of Fig. 14.

Fig. 16 is a side view of a work piece, with parts broken away.

Fig. 17 is an end view of the work piece.

Fig. 18 is a longitudinal sectional view of a machine embodying my invention but of a different form of construction.

Figure 19:
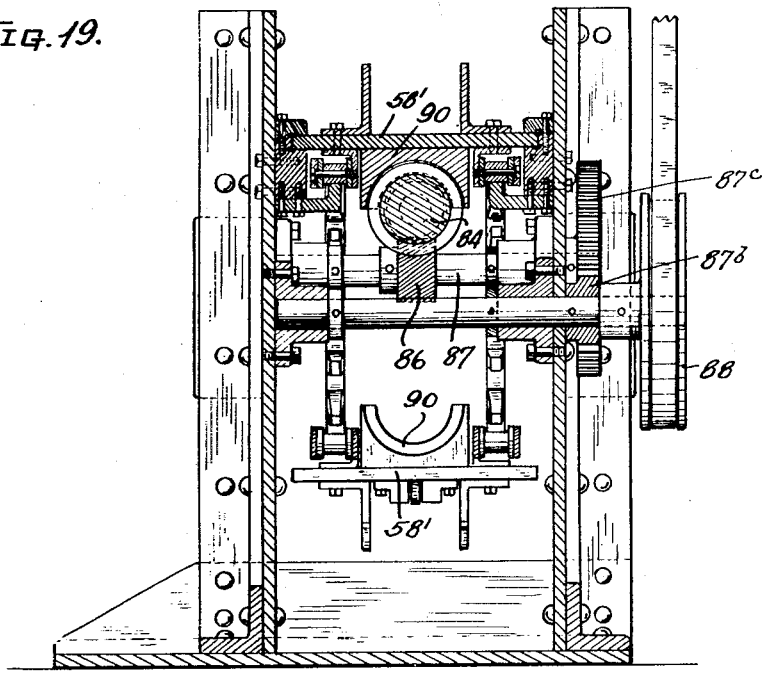
Figure 20:
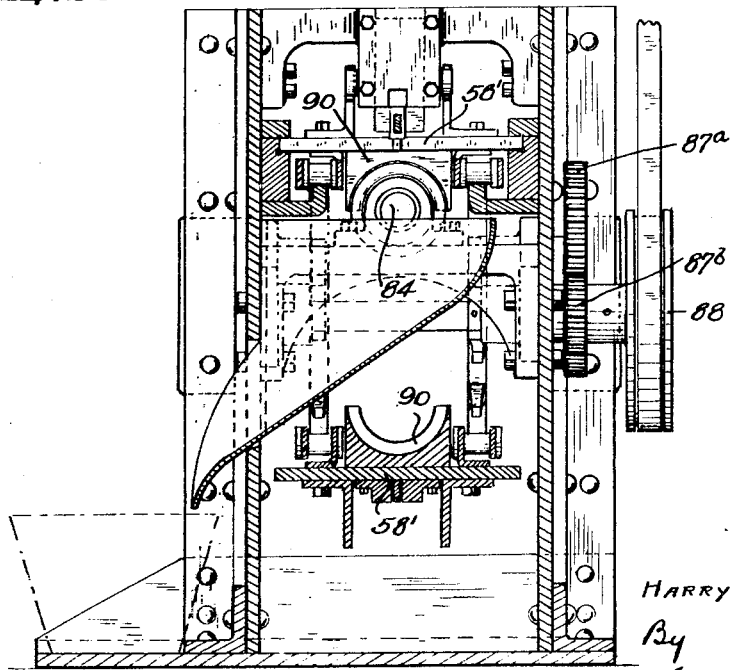

Figs. 19 and 20 are sections on the lines 19—19 and 20—20, respectively of Fig. 18.

Referring to Figs. 1 to 4, inclusive, 1 indicates as an entirety the support having a base 1a and side members 1b. In this form of construction I may shape and construct the support 1 so as to form a tank for a suitable cutting compound. The side members 1b support a pair of transverse shafts 3, 3a, disposed in spaced relation and mounted in suitable bearings 4, one of these shafts (3) being driven by a driving means indicated as an entirety at 5. The shafts 3, 3a, have secured to them pairs of sprockets 6—6, 7—7, respectively, on and around which an endless carrier, such as a pair of endless chains 8, run in a well known manner. Each sprocket 6, 6, 7, 7, may be keyed to the adjacent shaft, and also adjustably secured thereto by suitable means, such as a set screw 9, fitting and extending through a threaded opening formed in the hub of the sprocket (see Fig. 3). In this form of construction, the blank B is arranged to engage a support, indicated as an entirety at 26 and the broaching tool, indicated as an entirety at 10x, is removably mounted on the chains 8 and is pulled thereby through the opening b in the blank B. The support 26 may comprise a pair of transverse bars or plates 26a, 26b, extending between and supported at their opposite ends by the side members 1b or standards extending upwardly therefrom and spaced from each other a distance slightly greater than the vertical width of the opening b, so as to engage the upper and lower portions or walls of the blank B. As shown in Fig. 3 the transverse bars 26a, 26b, are disposed in planes above and below the plane of the run of the chains 8, so that the opening b to be broached may be arranged in the plane in which the tool 10x travels (see Fig. 2).

The driving means 5 preferably comprise a shaft 11 mounted in suitable bearings in the side members 1b, and carries on its extended end a gear 12 and a power element, such as a pulley 13 for a belt 14. The gear 12 meshes with a pinion 15a which is fixed to the shaft 3.

The tool 10x comprises a body portion, on which the teeth are cut, and a shank 10x', which is detachably connected to the chains 8 in the manner to be later set forth. The cutting teeth extend entirely around the body portion of the tool, so as to effect broaching on all of the inner walls of the opening b. The teeth on the body portion are formed in a well known manner.

21, 21a, indicate a pair of transverse members, each supported at its opposite ends by two aligned links of the chain 8, and arranged to engage the tool shank 10x', whereby the tool is pulled endwise through the opening b. The tool shank 10x' is interlocked with the transverse members by suitable devices which permit ready engagement with and disengagement from the members 21, 21a, these devices preferably comprising a hook-like end 22 which engages the member 21 and the end wall of a notch 22a to receive the member 21a, the latter also serving, by its cooperation with the hook end 22 and member 21, to support the tool in the plane of the chains and between them. In the form of construction shown in Figs. 1 and 2, the opening for the hook end 22 leads inwardly from the edge of the shank 10x', which arrangement permits the tool to release itself from the members 21, 21a, and fall downwardly as it is carried by the chains 8 around the sprockets 6 (see dotted lines in Fig. 2); it also permits the tool shank 10x' to be readily connected to and detached from the supporting member 21, 21a. As shown in Fig. 2, the hook end 22 is undercut sufficiently to prevent the tool from dropping downwardly between the chains due to the weight of the body portion. For the purpose of forming seats for the tool shank 10x' and insuring its positioning in a plane centrally between the chains, the transverse members 21, 21a, at the center portions are reduced for a distance equal to the thickness of the tool shank 10x', to form seats midway between the chains. As a result, the shoulders formed by the reduced portions will operate to properly position the tool and hold it in such position as it is moved to pull endwise by the chains 8. As the shank seats are in alignment with each other, that is disposed in a plane parallel to the chains, the direction of movement of the tool 10x will be at right angles to the supporting bars 26a, 26b. This arrangement insures accurate broaching of the walls of an opening that extend longitudinally of the blank and at right angles to one end wall thereof, or that end wall which abuts the supporting bars 26a, 26b. In positioning the tool and connecting its shank 10x' to the transverse members 21, 21a, the operator first threads a blank B on to the shank and moves it therealong to a point adjacent its body or teeth bearing portion; he then holds the tool until the transverse members move upwardly around the sprockets 7 and as the links carrying these members leave the sprockets, the operative manipulates the tool shank to effect engagement of the hook 22 and notch 22a with the members 21, 21a, respectively. The operative may then retain hold of the tool or the blank or both to guide the blank into engagement with the supporting means 26. When the tool passes through the blank, the operative removes the blank, or it may be allowed to drop onto a chute (not shown) and discharged into a receiver. After broaching the blank opening b, the tool 10x may be manually detached from the carrier or it may be carried around the sprockets and caused to release itself. In either arrangement I prefer to provide a means, indicated as an entirety at 27, for passing the tools 10x through the cutting compound and returning them to the forward end of the support 1, where the operative can readily pick up each tool and position it on the carrier. Of the return means 27, 27a, 27b, indicate a pair of shafts, the former mounted in bearings provided in lugs 1c on the front end wall of the support 1 and the other mounted on the bottom 1a near the rear end wall of the support 1. The shafts 27a, 27b, carry sprockets 28 for endless chains 29 between which is disposed an endless belt 29a of any suitable construction, the belt 29a being connected to the chains 29 so as to be supported and operated by them. The shaft 27a has an extension to which is secured a sprocket 30 for a chain 31 running around a sprocket 32 fixed to the shaft 11, whereby the belt 29a is driven. As shown in Fig. 2, the return conveyor 29a extends along the bottom 1a to the front end thereof and then up the front wall 1x of the support 1, this wall being inclined for this purpose and its upper end being spaced from the sprockets 7 to provide a relatively wide delivery opening. 33 indicates suitable guide devices for the chains 29 and belt 29a at the front end of the bottom 1a so as to guide them upwardly along the inclined wall 1x. The guide devices comprise a shaft 33a, loosely fitting openings in the side members 1b and held in position by a plug 33b screwed into the outer end of the opening in one wall, sprockets 33c being fixed to the shaft 33a and arranged to engage the upper and lower runs of the chain 29 and a pair of rollers 33d loosely mounted on stud shafts 33e extending inwardly from the inner faces of the side member 1b and arranged to engage the upper run of the chains 29. As shown in Fig. 4, the shafts 33e comprise bolts threaded into openings formed in the side members, their heads being preferably countersunk in the ends of the rollers 33d and serving to hold them in position on the shafts. 34 indicates a device which cooperates with the carrier to effect the release or disconnection of the tools therefrom, whereby they drop on the apron or belt 29a. The device 34 comprises a transverse member disposed in spaced relation to the sprockets 6, so that the free end of the tool 10x as it moves with the carrier around the sprockets, will engage therewith, which engagement will cause the opposite end (the shank 10x') to swing downwardly and thus disengage the members 21, 21a, as shown in dotted lines in Fig. 2. The shank 10x' when disengaged from the carrier, will drop onto the belt 29a, which will draw the tool off of the device 34 and convey it to the front end of the support 1. Where a return means is provided, I may use several tools 10x, so that additional blanks may be broached without waiting for the tool to return as would be the case if only one tool were used. To facilitate the delivery of the tools to the belt 29a, the device 34 may comprise a concave roller loosely mounted on a shaft 34a supported in lugs, provided on the end wall of the support 1.

When the tool 10x is detached manually from the carrier, it may be dropped downwardly through the space between the end wall of the support 1 and the sprockets 6, where it will engage the belt 29a and be returned thereby.

In Figs. 5 and 6 I have shown a modified form of supporting means for the blank B arranged to engage the side edges of the blank instead of its upper and lower edges. In these views, 35 indicates standards mounted on the side members 1b (only one being shown) and supporting a cross bar 36 having a knuckle 36a. 37 indicates a member having a pair of knuckles 37a straddling the knuckle 36a and connected thereto by a pin 37b, whereby the member is pivotally connected to the bar 36. The member 37, when in operative position, depends downwardly from the bar 36, it having a tail portion 38 to engage the lower side of the bar and hold it stationary. The lower portion of the member 37 is slotted, as shown at 37', to provide legs 37x which are engaged by the blank B at either side of its opening b. 39 indicates a coiled spring disposed between the tail portion 38 and the bar 36 and normally tending to swing the abutment member 37 to the position shown in dotted lines in Fig. 5, whereby it clears the transverse shank supporting members 21, 21a. In this form of construction, the abutment is allowed to occupy its normal position until the supporting members 21, 21a, have passed by it, following which it is engaged by the blank or work piece and moved downwardly thereby to its operative position and held therein, as it and the tool are pulled forwardly by the carrier, the slot 37' in the member 37 permitting it to move to this position without interference with the tool shank 10x'.

Figure 8:
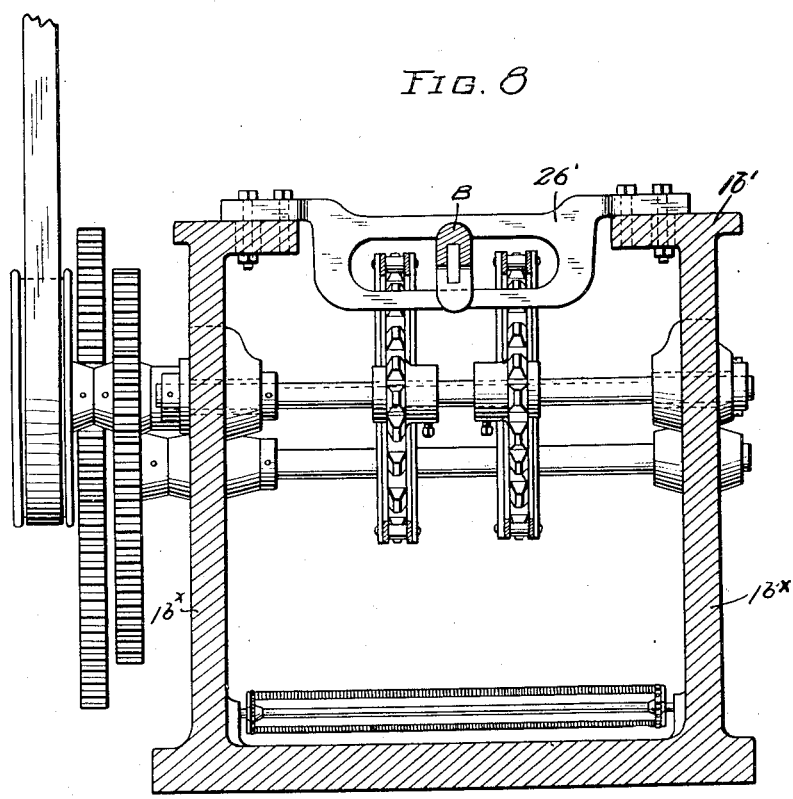
Fig. 8 is a transverse section of a machine embodying my invention, but of a different form from that shown in Fig. 1.
Figure 9:
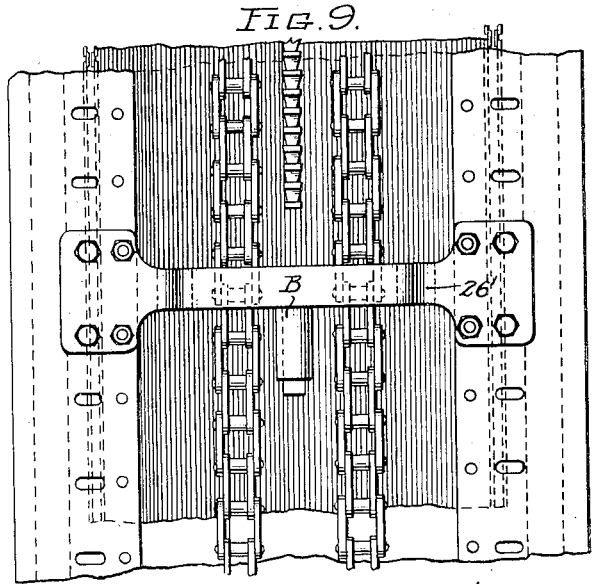
Fig. 9 is a plan view of the parts shown in Fig. 8.

In Figs. 8 and 9 respectively, I have shown a form of construction similar to that illustrated in Figs. 1, 2 and 3, except that the upper portions of the side member 1bx are provided with flanges 1b' to which is adjustably secured a support 26' for engagement by the blank B, so that a tool 10x may be connected to the chains and be pulled thereby to broach the opening in the blank.

Referring to Figs. 10 to 15, 40 indicates a base having spaced side members 41, 41, which may be formed integrally therewith or connected thereto by angles 42. The side members may be reinforced by upright angles 43 and cross angles 44. Between the side members 41 I may provide a trough (not shown) for holding and receiving a suitable cutting compound used in broaching. 45 indicates bearings mounted on the angles 43 and adapted to support transverse shafts 46, 46a, one of which (46) is driven by a gear train 47, the gears of which are carried by shafts 48, 49, 50, mounted in suitable bearings 51 provided on the side members 41. The shaft 50 has an extended end carrying an element to which power is applied, this element preferably comprising a pulley 52 for a driven belt 53. The shafts 46, 46a, have secured to them pairs of sprocket wheels 54—54, 55—55, respectively, on and around which a carrier such as a pair of endless chains 56, 56, run in a well known manner. Each sprocket 54—54, 55—55, may be keyed to the adjacent shaft, such connection being desirable between the shaft that is driven and the sprockets thereon and each is adjustably secured to the adjacent shaft by suitable means, such as a set screw 57 fitting and extending through a threaded opening in the hub of the sprocket, to permit of the adjustment of each sprocket endwise of its shaft to space the chains 56, 56, relative to each other. 58 indicates a tool carrying member mounted on the chains and provided with connecting elements which co-operate with connecting elements on the broaching tools 65 to removably connect the latter to the carrying members 58. I provide on the chains 56 a plurality of tool carrying members 58, uniformly spaced around the chains, so that the broaching operations may be carried on at a rapid rate one after another, the rapidity only being limited by the ability of the operative to remove a tool from its carrying member, thread a blank thereon and re-mount it on the same or a succeeding carrying member. Each carrying member 58 comprises a base 58a and sides 59 which are secured in any desired manner to aligned links of the chains 56. This form of carrying member, provides for the mounting of the broaching tools in the plane of the chains 56, as will later appear. By preference, I extend the pintles 60 for the aligned links and thread their inner ends into threaded openings formed in the sides 59, as shown in Fig. 15. 61 indicates a standard rigidly mounted on each base 58a. Each standard 61 consists of spaced portions 62, 62, and a bar 63 near the forward ends of and extending transversely across the space between the portions 62, 62, this bar and spaced portions being preferably formed integral. The bar 63 is wedge-shaped in cross section (see Fig. 14) and adapted to be engaged by the hook 64 of the tool 65, the bar 63 and hook 64 constituting the connecting elements already referred to. The outer sides of the portions 62 are provided with flanges 66, which are secured rigidly to the base 58a by suitable bolts. The portions 62 are spaced from each other sufficient distance to readily receive the shanks 65a of the tools 65, but are close enough to prevent twisting of the tool or its becoming displaced. In addition to the engaging or connecting element 63 I prefer to provide yieldable interlocking devices which engage the tool shank and co-operate with the elements 63 and 64 to hold the tool in position while it is being pulled forwardly by the chains 56 and also while traversing the sprockets 55, 54, and the lower run of the chains. I preferably provide two yieldable devices which co-act to maintain the tool shank 65a substantially midway of the space between the portions 62, 62. Each device consists of a pin 67 slidably mounted in an opening 68 extending transversely through each portion 62, the opening in one portion being aligned with the opening in the other portion, as shown in Fig. 15. The outer portion of each opening is threaded to receive a plug 69 formed with an axial opening to receive and guide the outer end of the pin 67. Intermediate its ends the pin carries a collar 70 and between the collar 70 and plug 69 and surrounding the pin 67 is an expansion spring 71, normally acting on the collar 70 to project the pin inwardly. The inner ends of the pin 67 are rounded and fit depressions formed in the opposite sides of the shanks 65a to detachably and yieldably engage the latter and in co-operation with the bar 63 to hold the tool in position and fixed relation to the support 58.

71 indicates an abutment for the work-piece or blank B, movably supported on the sides 41, 41, so that it may be displaced or moved to an inoperative position to permit the supports 58 and parts carried thereby to pass the abutment as the chains 56 move the supports forwardly. In this form of construction the abutment 71 is slidable vertically, being (a) preferably arranged to move downwardly to its operative position, that is, that position wherein it is in position to engage the work-piece and hold it stationary while the chains 56 pull the broaching tool 65 through it and (b) operable to its inoperative position by a cam or a pair of cams carried by the chains 56, each cam or pair of cams being so arranged that the abutment is elevated as each support approaches the abutment and is held in such elevated position as the support 58 moves past it (see Fig. 13) and then is permitted to move downwardly immediately after the support passes the abutment so that the latter is in position to be engaged by the work-piece B, as shown in Fig. 14. I preferably provide on each support 58 a pair of cams 72, one carried by each of the sides 59. In the preferred form of construction the cams 72 are formed integrally with the sides 59. Each cam 72 has an upwardly inclined surface 72a, a horizontal surface 72b and a downwardly curved surface 72c. The cams are arranged to engage rollers 73, carried by stud shafts having portions threaded into the opposite side walls of the abutment 71. The abutment 71 comprises a body portion 71a slidably mounted in a housing 74 and depending member 71b spaced to accommodate the tool but arranged to be engaged by the front walls of the work-piece at opposite sides of the opening b therethrough, as the blank is carried along with the tool (see Figs. 10, 14 and 15), as will later appear. The body portion 71a may be of rectangular shape in cross section and the guide housing 74 is therefore of corresponding shape. The housing 74 is supported by a pair of arms 75 on the sides 41. As shown in Fig. 11, the arms 75 are formed integrally with the side and rear walls of the housing 74 and secured by suitable bolts to the sides 41. The front wall of the housing is secured in position by bolts 74a. The sides of the housing 74 are formed with slots 76 to provide for the movement of the stud shafts which carry the rollers 73 and the front and rear walls of the housing are cut away, as shown at 77, to avoid contact with any forwardly projecting portions of the work-piece.

78 indicates guides for the supports 58 operating to maintain them in a predetermined position as the tools effect the broaching operations. The guides 78 extend longitudinally of the sides 41 so as to guide all of the supports 58 as they are moved by the chains 56 along their upper run, the purpose being to reduce to a minimum jerks in the chains incident to the resistance of the tools as they effect broaching and relaxation of this resistance on the driving means at the end of each broaching operation. Each guide consists of a bar having spaced flanges forming between them a guide-way 78a into which fits a shoe 79 projecting laterally from the adjacent side of each support 58. The shoes 79 are preferably formed integrally with the side walls 59 of the supports 58. By slidably supporting the supports 58 in the upper run of the endless chains 56, sagging of the latter is prevented and this tends to reduce jerks on the chains which would affect the proper engagement of the tool teeth with the work-piece as well as reduce wear on the tool teeth, it being desirable to secure as far as possible uniform driving of the chains.

In operation, the operative stands at the right hand end of the machine, as viewed in Fig. 10, and removes each tool 65 as it moves upwardly around the sprockets 54 and then places a blank B on the tool shank 65a, telescoping or threading it over the tool shank at the end provided with the hook 64; the operative then re-places the tool on the support 58 by engaging the hook or connecting element 64 with the connecting element or bar 63 and pressing the shank 65a downwardly between the interlocking pins 67. As the tool and blank are drawn forwardly by the chains, the blank comes into engagement with the depending members 71b of the abutment 71 and is held thereby while the tool continues its movement forwardly, thus effecting the broaching of the walls of the opening b.

When the tool moves entirely through the blank, the latter falls by gravity into a chute 80, which delivers it to a receiver 81.

In Figs. 18, 19 and 20, I have shown a form of construction in which the driving of the chains is effected by the application of power direct to the tool carrying supports instead of to the shaft for one pair of sprocket wheels. In this arrangement I provide a pair of cross members 82 and support them on the sides 41. The cross members 82 are provided with suitable bearings 83 which rotatably support the opposite ends of a feed screw 84. The cross members are arranged rearwardly of or beyond the abutment 71', the purpose being (a) to provide clearance below the abutment and forwardly thereof so that blanks or work-pieces of different diameters may be operated upon and (b) to permit the metal filings to drop downwardly without falling on the feed screw 84. Between the rearward end of the screw 84 and the adjacent bearing 83, the shank 84a of the screw has secured to it a worm 85 meshing with a worm 86. The worm 86 is secured to a shaft 87, which carries at its outer end a gear 87a, meshing with a pinion 87b. The pinion 87b is fixed to a shaft 87c mounted in the sides 41, the latter shaft has a power element, such as a pulley 88, driven by a belt 89. 90 indicates nuts carried by the lower face of each support 58' and adapted to engage the feed screw and be moved thereby. As shown, the mean diameter of the screw 84 is greater than the height of the bearings 83 measured from their axes and the diameter of the worm 85, and the nuts 90 are of semi-circular shape so that they may move into engagement with the threads of the screw and disengage therefrom without contact with these parts; also it will be noted that the supports are spaced relative to each other so that at least one of the nuts is always in engagement with the screw and is being driven thereby. In this form of construction, the guides 78 serve to guide the supports along a predetermined plane not only for the purpose already set forth, but to insure engagement of the nuts with the screw and to maintain such engagement from end to end thereof, thereby resisting any tendency of the nuts to rise upwardly. It will be noted that a suitable gear reduction may be provided between the elements to which power is applied and the shaft carrying the worm 86, when desired.

72' indicates the cams carried by each support 58' adapted to operate and control the abutment 71' as already set forth. Each support is provided with tool connecting elements to be engaged by the tool such as already described.

The construction disclosed herein is adapted to broach the inner walls of a jaw wrench, and in carrying out such operation I use a tool the body portion of which is provided with broaching teeth around its circumference or on all four walls thereof. Where a gear, sleeve, housing, or other element is to be broached, internally, the teeth on the body portion are arranged to engage those walls of the element to be broached and are not extended entirely around the tool, and the construction of the abutment 71 is changed so as to engage such element. For this purpose, the housing is removable to permit another abutment to be positioned depending on the shape or construction of the element to be broached.

In the forms of construction herein disclosed, the tools are successively mounted on an endless carrier and a blank is mounted on each tool, so that as the carrier is driven in one direction and broaching operations are carried out successively in a rapid manner without stopping the carrier or resetting of parts.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

This application is a continuation in part of my application, Serial No. 136,253, filed September 18, 1926.

What I claim is:—

1. In apparatus of the class described, the combination of a support, an endless carrier mounted on said support, means on said carrier for removably supporting a broaching tool with a work piece thereon, an abutment on said support disposed in the path of movement of the work piece and arranged to arrest its movement, whereby the tool moves relative to the work piece, and means for driving said carrier in one direction.

2. In apparatus of the class described, the combination of a support, an endless carrier mounted on said support, means on said carrier for supporting a tool, an abutment movably mounted on said support and arranged to move into an inoperative position to permit the passing of said tool supporting means and to move into operative position to engage a blank on the tool, means for driving said endless carrier in one direction, and means on said carrier for controlling the movement of said abutment.

3. In apparatus of the class described, the combination of a support, an endless carrier mounted on said support, means on said carrier for supporting a tool, an abutment movably mounted on said support and arranged to move into an inoperative position to permit the passing of said tool supporting means and to move into operative position to engage a blank on the tool, means for driving said endless carrier in one direction, and a cam on said carrier for controlling the movement of said abutment.

4. In apparatus of the class described, the combination of a support, an endless carrier on said support, means on said carrier for removably supporting a broaching tool, an abutment arranged to engage a blank on the tool and hold it while the tool is being drawn through the blank by said carrier, guide means on said support for movably supporting said abutment, whereby said abutment may be moved to an in-operative position to permit said tool supporting means to pass said abutment, means on said carrier for moving said abutment to its in-operative position and controlling its movement to the operative position, and means for driving said carrier in one direction.

5. In apparatus of the class described, the combination of a support, an endless carrier on said support, means on said carrier for removably supporting a broaching tool, in the plane of the carrier through one run thereof, an abutment arranged to engage a blank on the tool and hold it while the tool is being drawn through it by said carrier, guide means on said support for movably supporting said abutment, whereby said abutment may be moved to an in-operative position to permit said tool supporting means to pass said abutment, means on said carrier for moving said abutment to its in-operative position and controlling its movement to the operative position, and means for driving said carrier in one direction.

6. In apparatus of the class described, the combination of a support, an endless carrier on said support, means on said carrier for removably supporting a broaching tool in the plane of the carrier through one run thereof, an abutment arranged to engage a blank on the tool and hold it while the tool is being drawn through it by said carrier, guide means on said support for movably supporting said abutment, whereby said abutment may be moved to an in-operative position to permit said tool supporting means to pass said abutment, means on said carrier for moving said abutment to its in-operative position, and controlling its movement to the operative position, guides on said support for guiding the carrier through that run thereof adjacent said abutment, and means for driving said carrier in one direction.

7. In apparatus of the class described, the combination of a support, an endless carrier mounted on said support, a tool having a broaching portion and a shank adapted to extend through a hollow blank, means for detachably connecting the tool shank to said carrier, an abutment on said support arranged to simultaneously engage a blank at opposite sides of the tool and hold it while the tool is being carried forward by said carrier, and means for driving said carrier in one direction.

8. In apparatus of the class described, the combination of a support, an endless carrier on said support, a plurality of supporting means on said carrier removably supporting broaching tools, an abutment arranged to engage a blank on each tool and hold it while the tool is being drawn forward by said carrier, a guide means on said support for movably supporting said abutment, whereby said abutment may be moved to an inoperative position to permit said tool supporting means to pass said abutment, means on said carrier for moving said abutment to its in-operative position and controlling its movement to the operative position, as each supporting means passes said abutment, and means for driving said carrier in one direction.

9. In apparatus of the class described, the combination of a support, an endless carrier mounted on said support, a plurality of supporting means connected to and uniformly spaced around said carrier, each said supporting means including devices for removably holding a broaching tool, an abutment arranged to engage a blank on each tool as the latter is moved forwardly by its supporting means, and means engaging said supporting means for moving said carrier in one direction, said moving means comprising a feed screw mounted on said support, nuts on said supporting means engaging said screw and means for driving said screw.

10. In apparatus of the class described, the combination of a support, an endless carrier on said support, a plurality of supporting means connected to and uniformly spaced around said carrier, each said supporting means including devices for removably holding a broaching tool, an abutment on said support arranged to engage a blank on each tool as the latter is moved forwardly by its supporting means, a feed screw arranged below that run of the carrier adjacent to said abutment, a nut carried by each supporting means and arranged to engage said screw, said feed screw being arranged rearwardly of said abutment and of greater length than the distance between two of said nuts, and means for rotating said screw.

11. In apparatus of the class described, the combination of a support, an endless carrier mounted thereon, a plurality of supporting members connected to and uniformly spaced around said carrier, a device on each member for removably holding a broaching tool, an abutment movably supported on said support for engaging a blank on each tool as the latter moves forwardly and arranged to be moved to an inoperative position to permit each tool support to pass said abutment, means on each said supporting member for controlling the movement of said abutment, guides for said supporting members for guiding the latter throughout that run of the carrier adjacent to said abutment, and means adjacent one run of the carrier for engaging said supporting means for effective movement of said carrier in one direction.

12. In apparatus of the class described, the combination of a support, an endless carrier mounted on said support and comprising a pair of spaced chains, a plurality of supporting means uniformly spaced around said carrier and connected between the chains thereof and each arranged to support a tool substantially in the plane of said chains, each said supporting means including a device for removably holding a broaching tool, an abutment arranged to simultaneously engage a blank at opposite sides of each tool as the latter is moved forwardly by its supporting means, and means engaging said supporting means for moving said carrier in one direction.

13. In apparatus of the class described, the combination of a support, an endless carrier mounted on said support and comprising a pair of spaced chains, a plurality of supporting means uniformly spaced around said carrier and connected between the chains thereof and each arranged to support a tool substantially in the plane of said chains, each said supporting means including a device for removably holding a broaching tool, an abutment arranged to simultaneously engage a blank at opposite sides of each tool as the latter is moved forwardly by its supporting means, said abutment being movable out of blank engaging position to permit movement of each supporting means by it, means engaging said supporting means for moving said carrier in one direction, and means for guiding said supporting means throughout the run of said carrier adjacent said moving means.

14. In apparatus of the class described, the combination of a support, an endless carrier on said support and comprising a pair of spaced chains, a plurality of supporting means uniformly spaced around said carrier and connected between the chains thereof and each arranged to support a tool substantially in the plane of said chains, each said supporting means including a device for removably holding a broaching tool, an abutment on said support arranged to engage a blank on each tool as the latter is moved forwardly by its supportng means, a feed screw arranged below that run of the carrier adjacent to said abutment, a nut carried by each supporting means and arranged to engage said screw, whereby said carrier is driven, and means for rotating said screw.

15. In apparatus of the class described, the combination of a support, an endless carrier on said support and comprising a pair of spaced chains, a plurality of supporting means uniformly spaced around said carrier and connected between the chains thereof and each arranged to support a tool substantially in the plane of said chains, each said supporting means including a device for removably holding a broaching tool, an abutment on said support arranged to engage a blank on each tool as the latter is moved forwardly by its supporting means, a feed screw arranged below that run of the carrier adjacent to said abutment and a nut carried by each supporting means and arranged to engage said screw, whereby said carrier is driven, and means for rotating said screw.

HARRY M. STAINFIELD.